Dec. 10, 1929.                P. DIEBOLD                1,739,295
                        TEMPERATURE REGULATION
                          Filed June 18, 1927
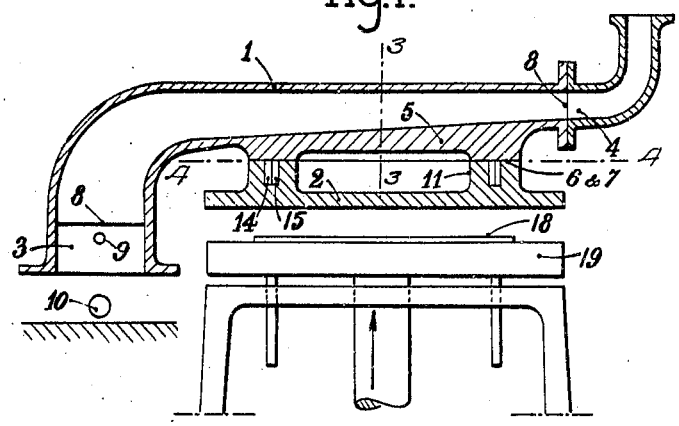
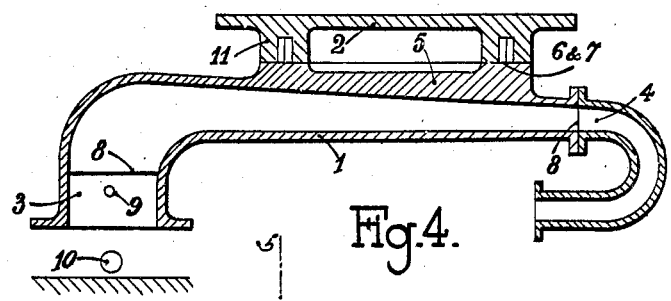
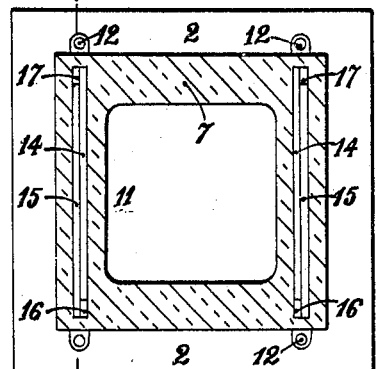
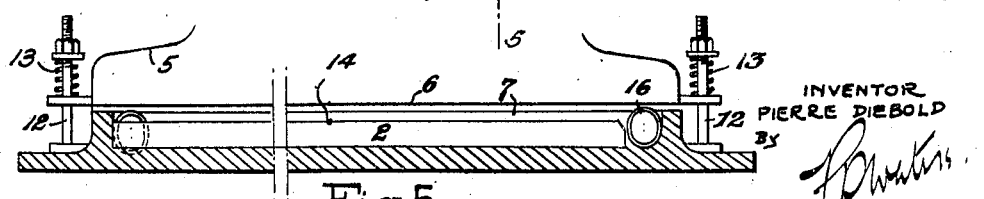
INVENTOR
PIERRE DIEBOLD
BY
ATTORNEY Patented Dec. 10, 1929

1,739,295

UNITED STATES PATENT OFFICE

PIERRE DIEBOLD, OF NANCY, FRANCE

TEMPERATURE REGULATION

Application filed June 18, 1927, Serial No. 199,853, and in France December 16, 1926.

This invention relates to means for heating by conductivity of heat, and which are applicable in every case where heat treatment has to be carried out at a constant temperature which however can be regulated at will to suit the nature of the operation to be performed.

In this connection may be mentioned for instance certain moulding operations, hot impressions, drying, calendering, ironing fabrics and clothes, and other applications.

The invention provides means for storing in a heating member or element constituting an accumulator, a reserve of heat at a practically constant temperature greater than the temperature utilized, and in regulating in a heat receiving member or element placed close to the accumulator, the temperature utilized, of variations of the resistance to the flow of heat from the heating element to the receiving element, which variations of resistance are controlled by the changes of temperature that may take place in the said receiving element or member.

In the devices for carrying the invention into effect, the heating member can be given various shapes, provided that it has a mass of metal sufficiently great to constitute a heat accumulator; it will be made of a metal which is a very good conductor of heat, such as for instance of aluminium or its alloys, and it will be suitably insulated. As a rule it will comprise a channel or conduit traversed by combustion gases of a very high temperature maintained at a practically constant level by a thermostat of any desired suitable type, and it will have, besides, an extensive bearing surface which brings it into contact with a corresponding surface of the receiving element to be heated by conductivity. The latter element, of a shape also variable according to the conditions, is provided with thermostatic devices constituted by expansion bars combined with deformable rings and regulating means which under the action of fluctuations of temperature in the receiving member or element, vary the pressure of contact of the heating element with the receiving element, or, if the fluctuations are considerable, break contact between the two elements, vary their distance and therefore maintain in the receiving element a constant utilizable temperature.

In the accompanying drawing which shows by way of example two means for carrying the invention into effect:

Fig. 1 relates to a first construction, and shows in vertical section a device in which the transmission of heat from the accumulator to the receiving member takes place in a downward direction; this figure illustrates at the same time an application of the device for the purpose of facilitating the explanation.

Fig. 2 is a modified construction of Fig. 1, in which the transmission of heat takes place in the upward direction.

Fig. 3 is a cross section on line 3—3 of Fig. 1;

Fig. 4 is a view on plan on line 4—4 of Fig. 1;

Fig. 5 is a section on line 5—5 of Fig. 4, to an enlarged scale.

According to the present invention, the heating element as it is shown in Figs. 1 and 2, is constituted by an extended conduit 1 in the form of a trumpet, traversed by the hot gases and having a longitudinal section preferably widened at the inlet 3, and slightly reduced at the outlet 4. This conduit is integral with a mass 5' which forms the seat and has a large bearing surface 6 through which the heat is conveyed to the receiving element 2 which has a corresponding bearing surface 7.

In order to obtain the greatest possible heat storing capacity in the heating element, the conduit 1 is provided inside with a number of ribs 8 which can be more clearly seen in Figure 3, and which offer a large surface of contact to the hot gases. These ribs could be flat or corrugated or have any desired irregular shape or be replaced by suitably arranged baffles. At the inlet of the conduit 1 is arranged a thermostat of any desired type, indicated at 9 and intended to maintain practically constant the quantity of heat supplied by the burner 10, gas ring or other device.

In this construction, the receiving element is constituted by the plate 2, with a solid flange 11 having the above mentioned bearing surface 7, the extent of which is shown by the cross hatched portion of Figure 4. This receiving element is connected to the heating element or accumulator 1 by an elastic link constituted by a number of bolts 12 surrounded by springs 13 which enable the pressure between these two parts 1 and 2 to be regulated, whilst at the same time allowing them a certain freedom of movement relatively to each other.

In the solid flange 11 are milled out two grooves (see Fig. 4) forming a seating for the thermostatic devices regulating the flow of heat between the accumulator and the receiver.

Each thermostatic element is constituted by an expansion bar 14 or 15, preferably of aluminium or other metal with a large coefficient of expansion, one end of which rests against one of the ends of its seat and the other against an elastic ring 16 or 17 engaging with the other end of the said seat. As shown in Figs. 4 and 5, two sets of bars and rings are arranged in each set in staggered positions for reasons of symmetry in their working. The diameter of the rings 16 and 17 is such that at the normal temperature that is to say when they are not heated, the upper portion of these rings is at the level of the bearing surface 7 or slightly back of it.

The working is as follows:

The flame from the burner 10 is regulated by means of the thermostat 9 in such a manner as to feed the accumulator with hot gases at a practically constant temperature which, as already stated, is greater than the temperature utilized in the receiver 2. Whilst these hot gases pass through the heating element, a reserve of heat at a practically constant temperature is therefore accumulated in the mass 5 as well as in the ribs 8.

As long as the heat receiver or plate 2 is cold, the two bearing surfaces 6 and 7 remain in contact, being held in contact by the pressure of the springs 13; at the beginning of the heating period, the heat can therefore pass directly, without meeting any resistance, from the heating element to the receiving element.

As the receiver 2 receives heat by conductivity, the bars 14 and 15 expand and compress the rings 16 and 17 which are thus rendered oval to a certain extent. Owing to this deformation, there takes place a reaction of the rings on the heating element, which reduces the pressure of contact determined by the springs 13, until it is completely cancelled, and the surfaces of contact are moved apart if required; in other words, there is produced a resistance to the flow of heat from 5 to 2. This resistance will become the greater, the greater be the distance between the surfaces 6 and 7, and this increase of resistance will correspond to a slackening of the heating of the receiver 2. By means of the springs 13 which are adjustable in order to oppose deformation of the rings 16 and 17, it is possible to impose a limit to the said slackening and to establish between the body 5, the receiver 2, the springs 13 and the rings 16, 17 a position of equilibrium (see Fig. 5) to which will correspond a given and constant maximum temperature in the receiver 2, which temperature will be different for each different tension given to the springs 13.

*Example of application.*—Let us consider in Fig. 1 an object 18 which has to be treated (moulded, dried, &c.) at a given constant temperature. This object could be for instance placed on a movable table 19 by means of which it will be brought in contact with the heat receiver 2.

For a temperature T of the hot gases, there will be available at 5 a temperature $t$ smaller than T, and in the receiver 2, a temperature $t'$ smaller than $t$ regulated by the springs 13 and equal to that at which the object 18 is to be treated.

At the moment of contact between the cold object 18 and the plate 2, there will take place in the latter a lowering of temperature. The expansion bars 15 and 14 will contract, and the elastic rings 16 and 17, under the action of the pressure of the said springs 13, will tend to resume their normal shape. This will result in the bearing surfaces 6 and 7 being brought closer together, and this closing could continue until complete contact is obtained. The receiver 2 then immediately takes from the reserve of heat, the quantity of heat required to compensate the loss suffered. As soon as the receiver resumes "temperature," the thermostatic system, bars and rings, will again come into action in order to re-establish the working temperature $t'$ which will not be exceeded, and this temperature will then remain constant during the whole time of contact between the object 18 and the plate 2.

What I claim is:

1. In a device for heating by conductivity, comprising a heating member forming an accumulator, and a heat receiver contacting therewith, two grooves milled in the surface of the heat receiver contacting with the accumulator, and a thermostatic device supported by the heat receiver, consisting of two pairs of expansion bars, one pair in each groove, each bar bearing at one end against one end of the groove, and an elastic metal ring in the free space left between the end of the bar and the end of the groove, in contact therewith as well as with the bearing surface of the heat accumulator.

2. In a device for heating by conductivity, comprising a heating member and a heat receiver in contact therewith, a thermostatic device supported by said heat receiver to keep a constant temperature therein, consisting of two pairs of expansion bars, each pair placed in a groove milled in the heat receiver, and two pairs of expansion rings arranged in staggered positions to each other, contacting with the bars, with the ends of the groove and the heat accumulator, to force the contacting surfaces of the accumulator and heat receiver off from each other, and means for reestablishing the contact between said members, consisting of a bolt and spring connection between said heating and heat receiving members.

PIERRE DIEBOLD.